July 6, 1926.  1,591,392

J. L. LUNDBERG

TRANSMISSION

Filed Sept. 27, 1924     6 Sheets-Sheet 6

INVENTOR.
John L. Lundberg
BY
Stuart C. Barnes
ATTORNEY.

Patented July 6, 1926.

1,591,392

UNITED STATES PATENT OFFICE.

JOHN L. LUNDBERG, OF ALPENA, MICHIGAN, ASSIGNOR TO HURON INDUSTRIES, INC., OF ALPENA, MICHIGAN, A CORPORATION OF MICHIGAN.

TRANSMISSION.

Application filed September 27, 1924. Serial No. 740,209.

This invention relates to transmissions and has for its object an improved force feed lubricated speed reducer, in which the bearings and jack shafts are so arranged as to give maximum rigidity and at the same time counteract as far as possible frictional and wearing forces. This will be more fully explained hereinafter.

Figure 1:
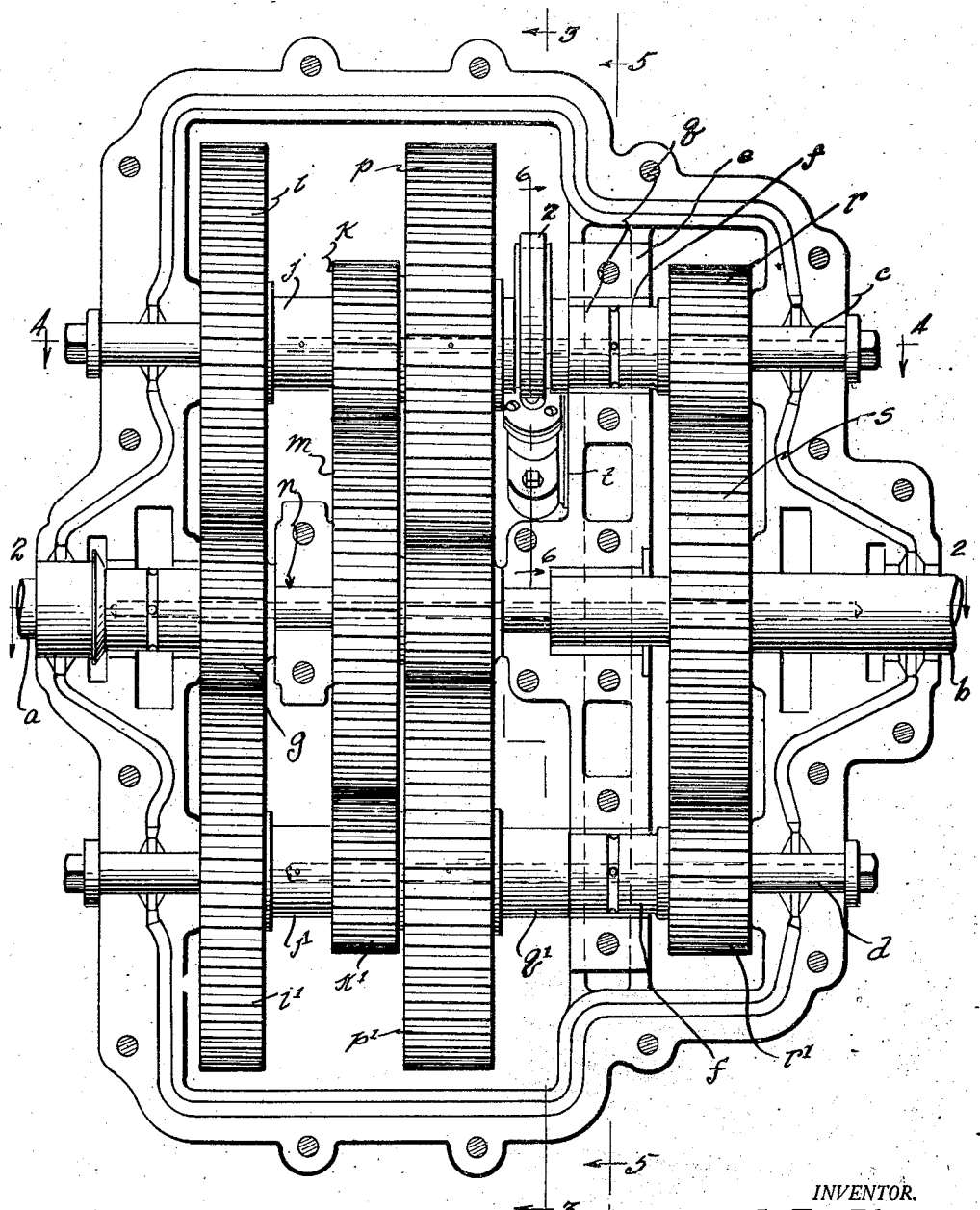
Fig. 1 is a plan view of the transmission with the cover removed.

$a$ designates the driving shaft, $b$ the driven shaft. It is the purpose of this transmission to provide a unit which may be inserted in the power line to greatly reduce the speed of the power shaft, thereby at the same time increase the force of the torque. To this end, instead of using the customary single jack shaft, two stationary jack shafts $c$ and $d$ are employed. These jack shafts extend from front to back of the transmission case and are bolted in place in the casing.

The castings that form the transmission case and the transmission cover are suitably moulded to provide an intervening bridge $e$ which extends across the transmission case from side to side, and which serves several purposes. One of those purposes is to form a third bearing for the jack shafts, which are here supported inside of the gear hubs $f$ which are part of the driving line of the transmission, as will presently be explained. The bridge thereby forms an additional bearing for these rotating gear hubs so as to provide a maximum rigidity to resist the forces set up by the rotating members in the transmission. The bridge, as will be apparent from Figs. 2 and 5, serves the additional function of providing an oil reservoir $h$, which will be presently described.

Now to trace the train of gears. The driving effort comes through the driving shaft $a$ to the spur pinion $g$ which meshes with the gears $i$ and $i^1$, which turn in opposite directions. These gears are connected by the hubs $j$ and $j^1$, with the spur pinions $k$ and $k^1$. These in turn mesh with the large gear $m$ carried on a small stationary shaft $n$, which is fitted into the driving pinion $g$, as clearly shown in Fig. 2. This gear $m$ is keyed to the hub of the small pinion $o$ which meshes with the two large gears $p$ and $p^1$ which are supported on the stationary jack shafts $c$ and $d$. These large gears $p$ and $p^1$ are connected by the long hubs $q$ and $q^1$ with the small pinions $r$ and $r^1$ that are on the opposite side of the bridge $e$. These pinions $r$ and $r^1$ mesh with the final driven gear $s$, which is keyed to the driven shaft $b$. The driven shaft $b$ is supported in suitable bearings in the bridge and in the rear end of the transmission case. It will be noticed that the long hubs $q$ and $q^1$ are journaled in suitable bearings in the bridge so that a maximum rigidity is supplied to resist the vibrational forces set up by the rotating parts.

This train of gearing thus described and in which the jack shaft is duplicated on each side of the power line is an important factor in reducing the frictional forces and the wear on the bearings and on the shafts. The wearing forces set up by the torque of the shafts is more or less counteracted by opposing on each side of the power line equal and oppositely directed torques that thereby tend to neutralize pressure on the bearings or on the shafts. This is a valuable feature in reducing the wear on the bearings, especially in heavy transmission lines where great power is transmitted and a heavy load is experienced on the transmission.

It is also most desirable in heavy machinery of this kind to have the best possible lubrication on account of the heavy load and the great power that is used. I am aware that it is not broadly new to use a force feed pump for distributing lubricant to a differential, for instance, but so far as I know no one heretofore has ever incorporated a force feed pump directly in the transmission case by suitably cored and bored casing bearings and shafts so as to provide a force feed lubricating cycle which is completely incorporated in the transmission case so that there cannot possibly be any leakage or breaks, and where there is no oil loss whatsoever, if the transmission cover and gasket are absolutely liquid tight.

Figure 6:
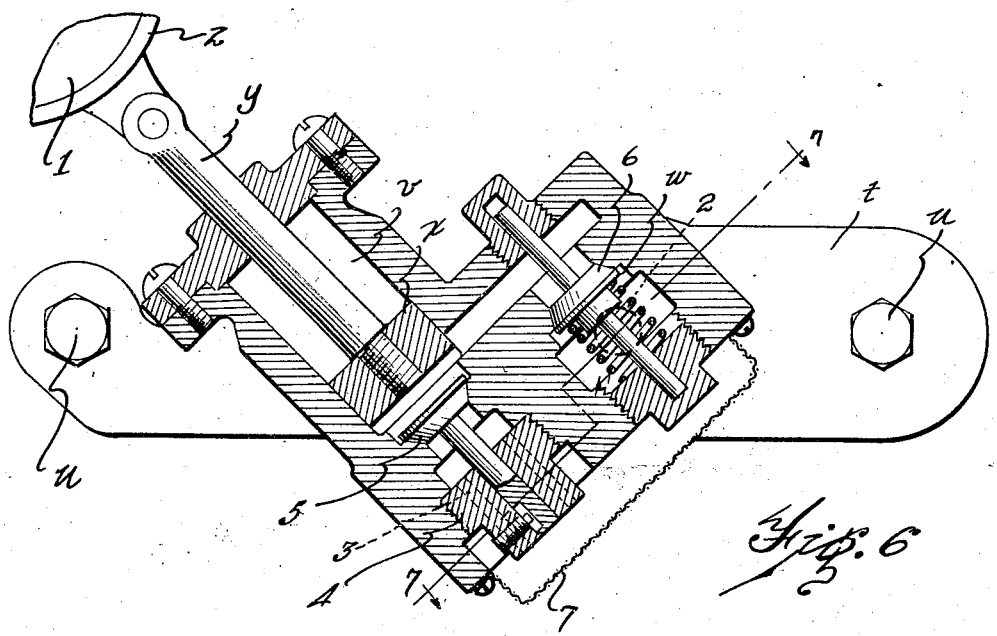
Figure 7:
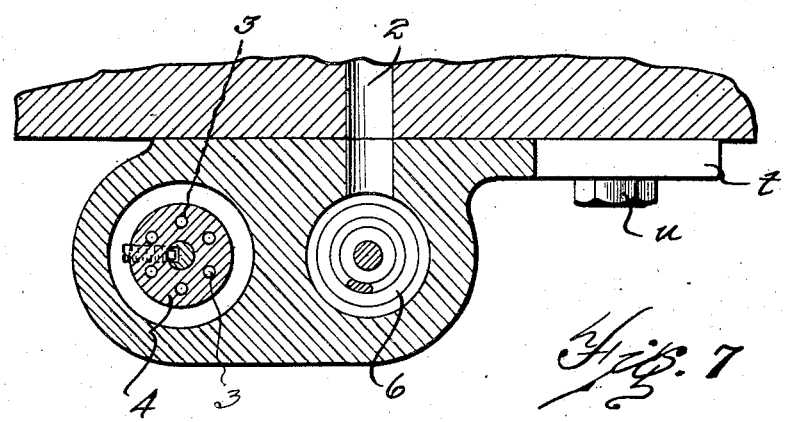
Fig. 7 is a section on the line 7—7 of Fig. 6.

Now adverting to the details of this force feed lubricating system, which is entirely incorporated in the interior of the transmission:

Referring to Figs. 6 and 7, it will be seen that the pump is a separable unit comprising a casting $t$ which may be bolted by the cap screws $u$ to the side of the bridge, as is clearly shown in Fig. 1. This casting $t$ forms a pump cylinder $v$ and a valve chamber $w$. A piston $x$ is connected by a piston rod $y$ with an eccentric strap $z$ which engages around an eccentric 1, that is integral with the gear hub $q$. Obviously rotation of the gear hub $q$ through the eccentric connections will cause the reciprocation of the pump plunger $x$. The lubricant is drawn up through the ports 3 in the plug 4. The intake valve 5 is raised by the atmospheric pressure behind the lubricant and the cylinder is charged. On the return movement of the plunger, the lubricant is forced ahead of the plunger closing the valve 5 and opening the spring-controlled valve 6, and forcing the charge out through the port 2. A strainer 7 is provided on the bottom of the pump, which strains the lubricant before it enters the pump. The transmission case is provided with a collecting well 8 in the bottom and the pump projects part way down into this well, as is clearly shown in Figs. 3 and 4.

Figure 2:
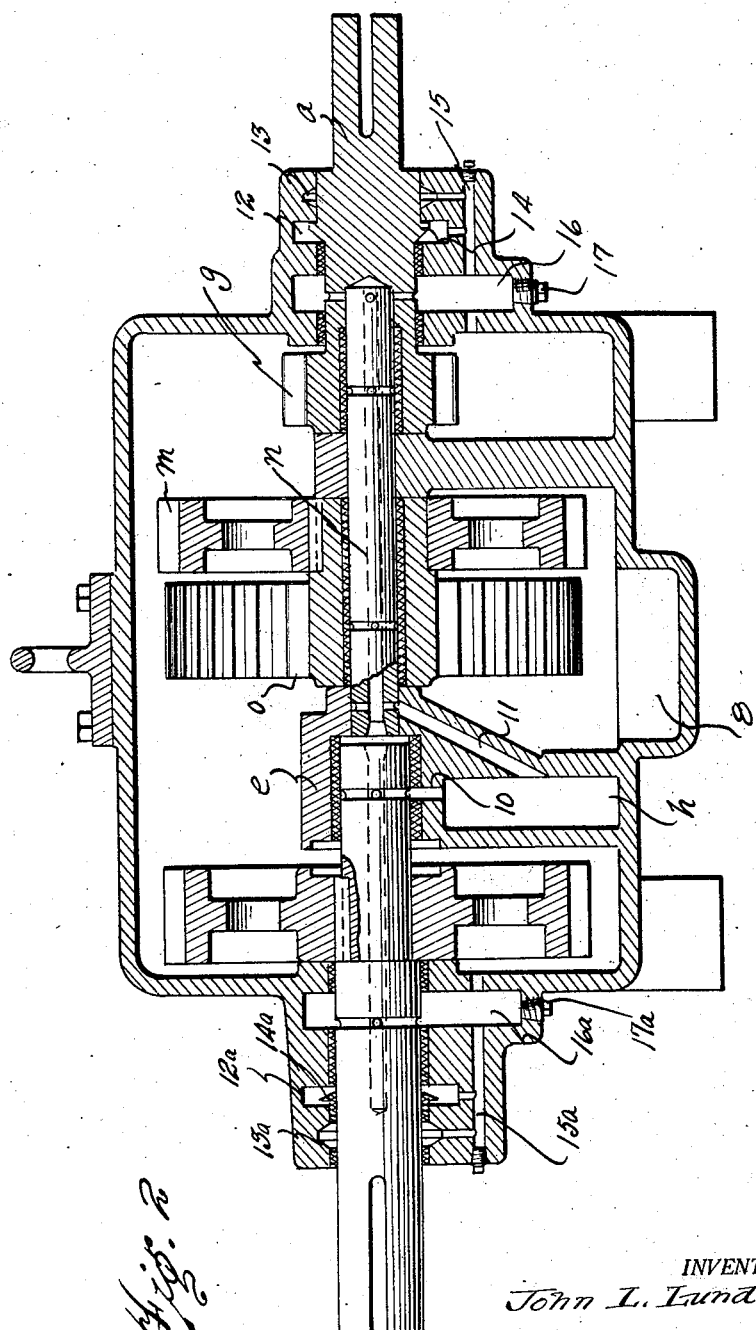
Fig. 2 is a longitudinal section taken on the line 2—2 of Fig. 1.
Figure 5:
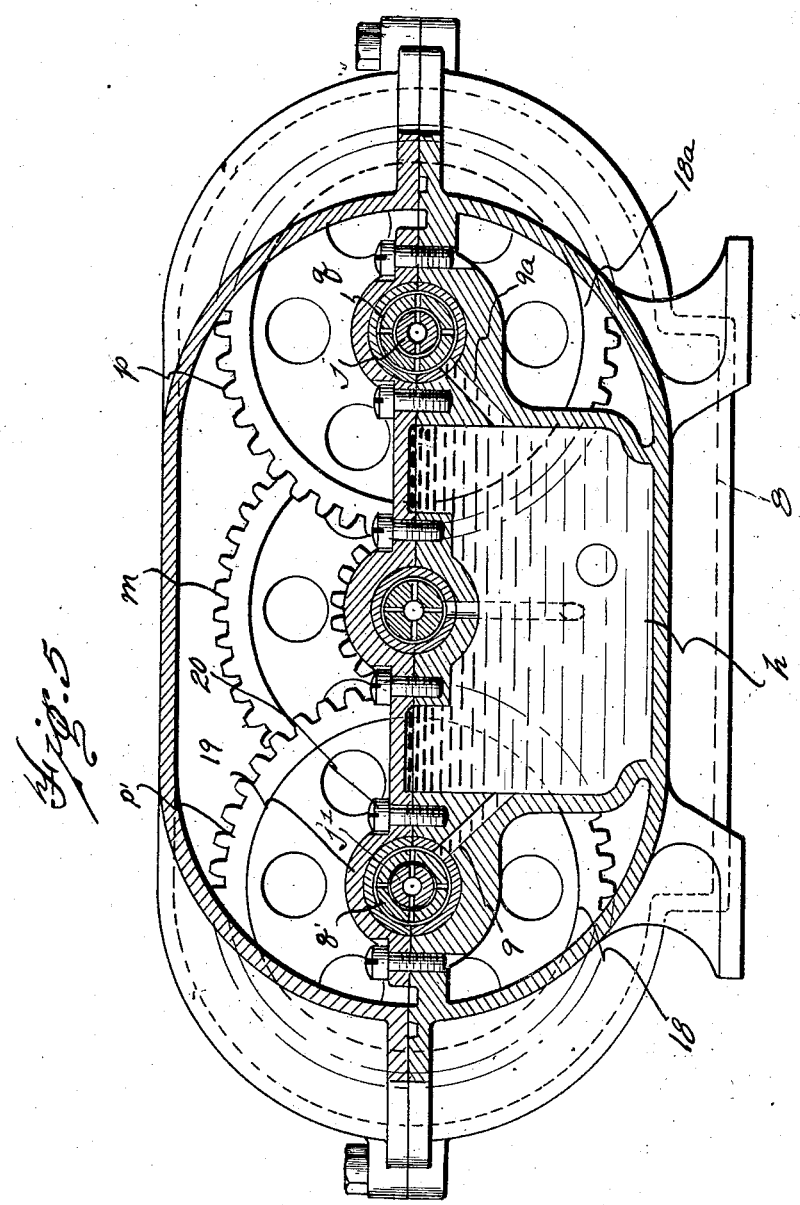

Referring now to Figs. 2 and 5, it will be apparent how the reservoir $h$ serves as a collecting chamber for the lubricant under pressure and distributes it with a force feed to the bearings. The reservoir $h$ is a cored out space in the bridge $e$. This bridge, as already referred to, forms a bearing for both jack shafts and also for the driven shaft, and the small center shaft $n$ (Fig. 2). Oil passages 9 and $9^a$ lead up to these bearings and through the bushings. This provides a direct oil feed to each jack shaft. Passages 10 and 11 (Fig. 2) lead directly from the oil reservoir to the driven shaft and the central stationary shaft $n$. Each one of these shafts has an annular groove with oil passages leading to the center of the shaft where a drilled oil conduit runs longitudinally of the shaft for distributing the oil to annular oil-receiving grooves through radial passage-ways. To designate all these by reference characters would involve too great detail. An examination of Fig. 2, shows that by this arrangement the bearing for the driven shaft in the rear of the transmission case, the bearing for the stationary central shaft $n$ in the driving pinion $q$ and the driving shaft $a$ and the bearing on which the gear and pinion turn on the stationary shaft $n$, are all lubricated by this distribution, also the bearing for the driven shaft $a$ in the forward end of the transmission case. It will also be seen that at the forward end of the transmission case oil collecting chambers 12 and 13, and $12^a$ and $13^a$ are provided. Collecting rings 14 and $14^a$ tend to direct the oil outwardly into the chamber 12 and $12^a$ and thence into the return conduit 15 and $15^a$. This returns it into the chambers 16 and $16^a$, and thence back into the bottom of the transmission case. The sediment may be flushed out of these chambers at times by taking out the drain plugs 17 and $17^a$.

In order to avoid undue minuteness of description, it will be unnecessary to give the details in connection with the force feed through the jack shafts. This is clearly shown in Fig. 4 and from this figure it will be apparent that by similar arrangement the bearings of the various gears on the jack shafts, the gear hubs in the bridge and the eccentric strap on the eccentric are all similarly lubricated by the force feed.

It will be noticed that the center of the bridge is provided with tunnels 18 and $18^a$ so that the oil dropping from the bearings can flow into the collecting well 8 to be drawn up by the pump.

Figure 3:
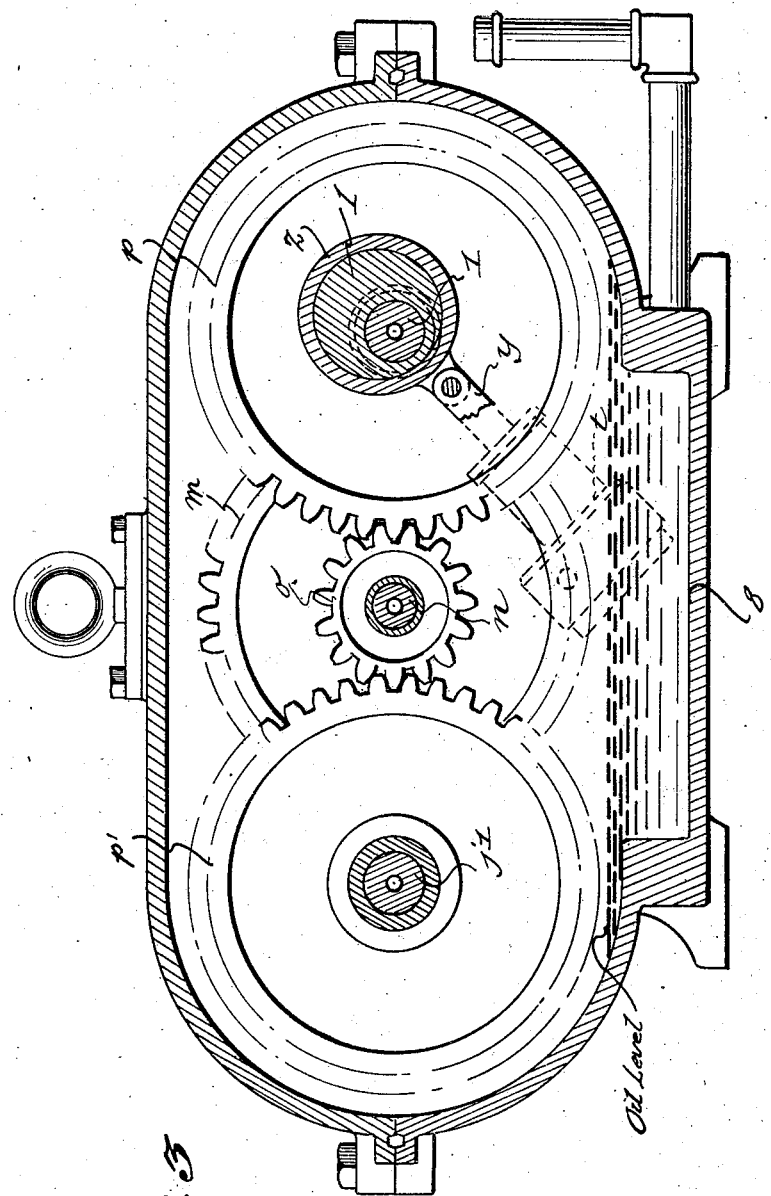
Fig. 3 is a section taken on the line 3—3 of Fig. 1.
Figure 4:
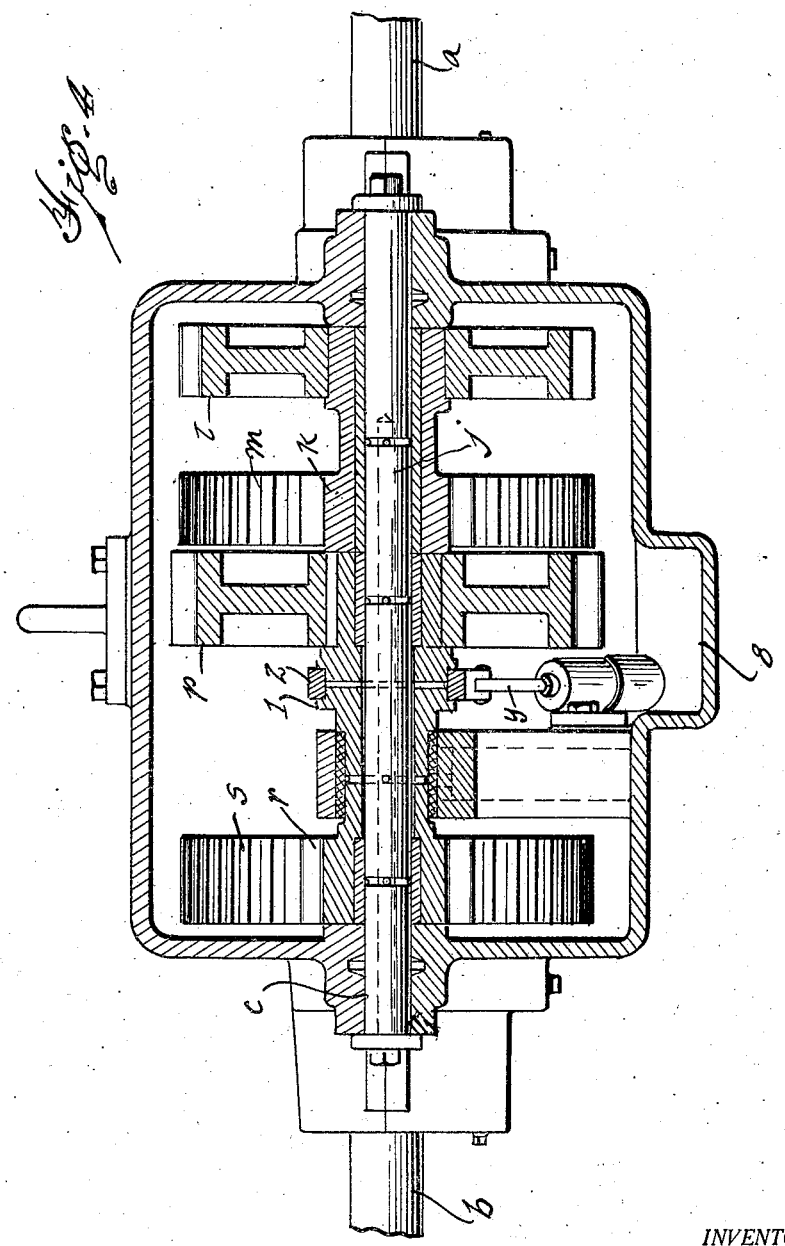
Figs. 4, 5 and 6 are sections taken on similar section lines of Fig. 1.

Another feature of this design is that the transmission castings are divided in substantially the center of the three shafts so that the lower casting forms the bearing supports for the three shafts or what is sometimes termed the pillow blocks. The cap plate 19 can be secured by screws 20 to the top of the lower casting, thereby bolting in place all the shafts and also serving as a cover for the oil reservoir $h$. The upper casting of the transmission can be bolted to the flange of the lower transmission casting and can at any time be removed for inspection of the gears without in any way disturbing the oil feed. Of course, the oil level may be such that the large gears dip into the same and spray it up over the other gears, but I prefer to have the oil level as shown in Fig. 3, slightly below the gears and depend upon the oil mist set up by the oil spraying out through the bearings to lubricate the teeth of the gears.

What I claim is:

1. In a transmission, the combination of a transmission case including a cover and also a bridge formed integral with the transmission case, driving and driven shafts finding bearings in the front and rear of the case and in the bridge, a jack shaft supported in the front and rear of the case, and a train of pinions and gear rotating at different speeds and supported on the shafts and provided with a hub having a bearing in the bridge.

2. In a transmission, the combination of a transmission case including a cover and provided with a central bridge, driving and driven shafts having bearings in the front and rear of the case and in the bridge, stationary jack shafts supported in front and rear of the transmission case and passing through the bridge, and pinions and gears rotating at different speeds and forming a train of gearing connecting the driving and driven shafts and rotatably supported on the shafts with hubs having separate bearings in the said bridge.

3. In a transmission, the combination of a case provided with a cover and including a transversely extending bridge forming a center oil reservoir, drive and driven shafts supported in front and rear of the case and in the bridge, a jack shaft stationarily supported at the front and rear of the case and passing through the bridge, a train of gearing connecting the driving and driven shafts and including a hub rotatably supported in a bearing in the bridge, and a pump for taking lubricant from the bottom of the transmission case and forcing the same under pressure into the reservoir, together with passageways distributing the same to the several bearings.

In testimony whereof I have affixed my signature.

JOHN L. LUNDBERG.